INVENTORS
Daniel J. Steiner
Cyril J. Schneider
by Wolfe, Hubbard, Voit & Osann
ATTORNEY United States Patent Office
3,475,998
Patented Nov. 4, 1969

3,475,998
METHOD AND APPARATUS FOR CONTROLLING THE MOTION OF A RECIPROCABLE TOOL ELEMENT OR THE LIKE
Daniel J. Steiner and Cyril J. Schneider, Kaukauna, Wis., assignors to Giddings & Lewis, Inc., Fond du Lac, Wis., a corporation of Wisconsin
Filed Oct. 16, 1967, Ser. No. 675,497
Int. Cl. B23b *47/24;* B23q *35/14*
U.S. Cl. 77—32.7      14 Claims

ABSTRACT OF THE DISCLOSURE

In the control of a drilling machine or the like, the drilling cutter is traversed rapidly toward a workpiece and its motion is converted to a slower feed rate at the instant the cutter engages the workpiece. Such engagement is sensed by producing a signal in the form of a series of pulses having a frequency proportional to the velocity of the cutter during traverse, and by detecting a decrease in the frequency resulting from a reduction in the velocity of the cutter as the latter strikes the workpiece. When such detection occurs, an engagement signal is produced to reduce the velocity of the cutter to a feed rate, and measurement of the displacement of the cutter is begun. The measured displacement is compared to a predetermined or desired and commanded penetration distance, and when the former becomes equal to the latter, the cutter is retracted. Advantageously, an artificial high velocity signal is impressed upon the frequency detector while the cutter is advancing at a feed rate, while the cutter is being retracted and while the cutter is accelerating from a dead stop to a traverse velocity so that, when the frequency of the pulses is in a low range during these intervals, the detector will not respond to the pulses and will not produce a false engagement signal.

---

This invention relates in general to a method and apparatus for the control of machine tools, and in particular to the control of reciprocable tool elements, which are traversed rapidly into operative position with respect to a workpiece and then are advanced at a slower feed rate toward or into the workpiece to effect machining of the latter. Although the invention will find advantageous use in many different applications, it is particularly well suited for controlling the operation of a vertical drilling machine and it will be described by way of example in that environment.

The primary aim of the present invention is to provide an extremely reliable and foolproof method and apparatus for converting the movement of a tool from a traverse rate to a feed rate automatically and as an incident to engagement of the tool with the workpiece, the invention being operable with equal effectiveness with a wide variety of tools and with workpieces of different materials.

It is an important object of the invention to signal the engagement of the tool with the workpiece in a novel manner by detecting the reduction in the velocity of the tool which results from such engagement.

A more detailed object is to produce a signal proportional to the traverse velocity of the tool and to detect a decrease in the value of the signal which results when the velocity decreases due to tool engagement with the workpiece.

Another object is to prevent a false signaling of engagement when the velocity-proportional signal is at a decreased value while the tool is moving at a slow velocity during acceleration from a dead stop to the traverse rate. A related object is to preclude the signaling of engagement at all times except during the interval beginning after acceleration of the tool to the traverse rate and terminating upon actual engagement of the tool with the workpiece.

Figure 1:
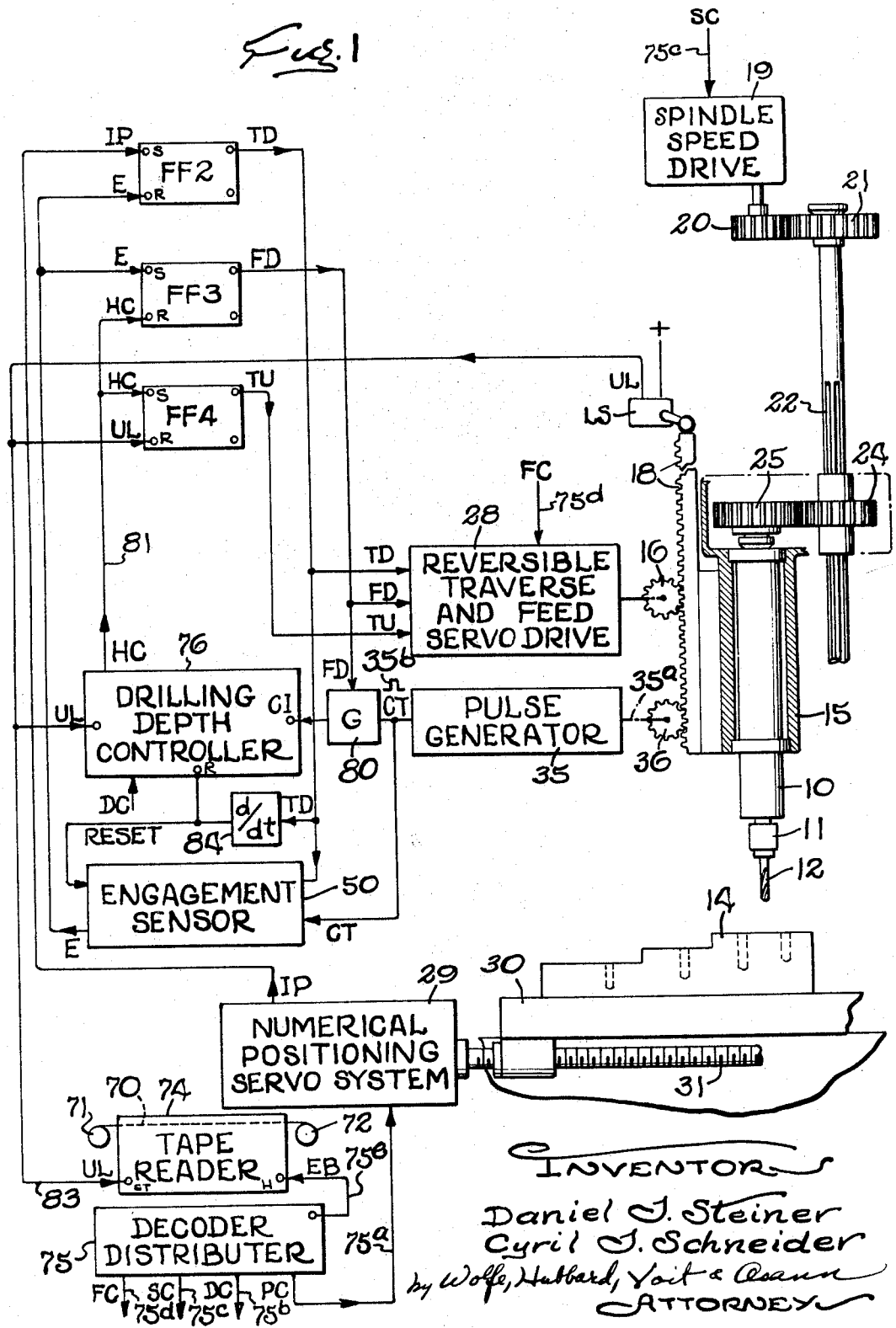
Figure 2:
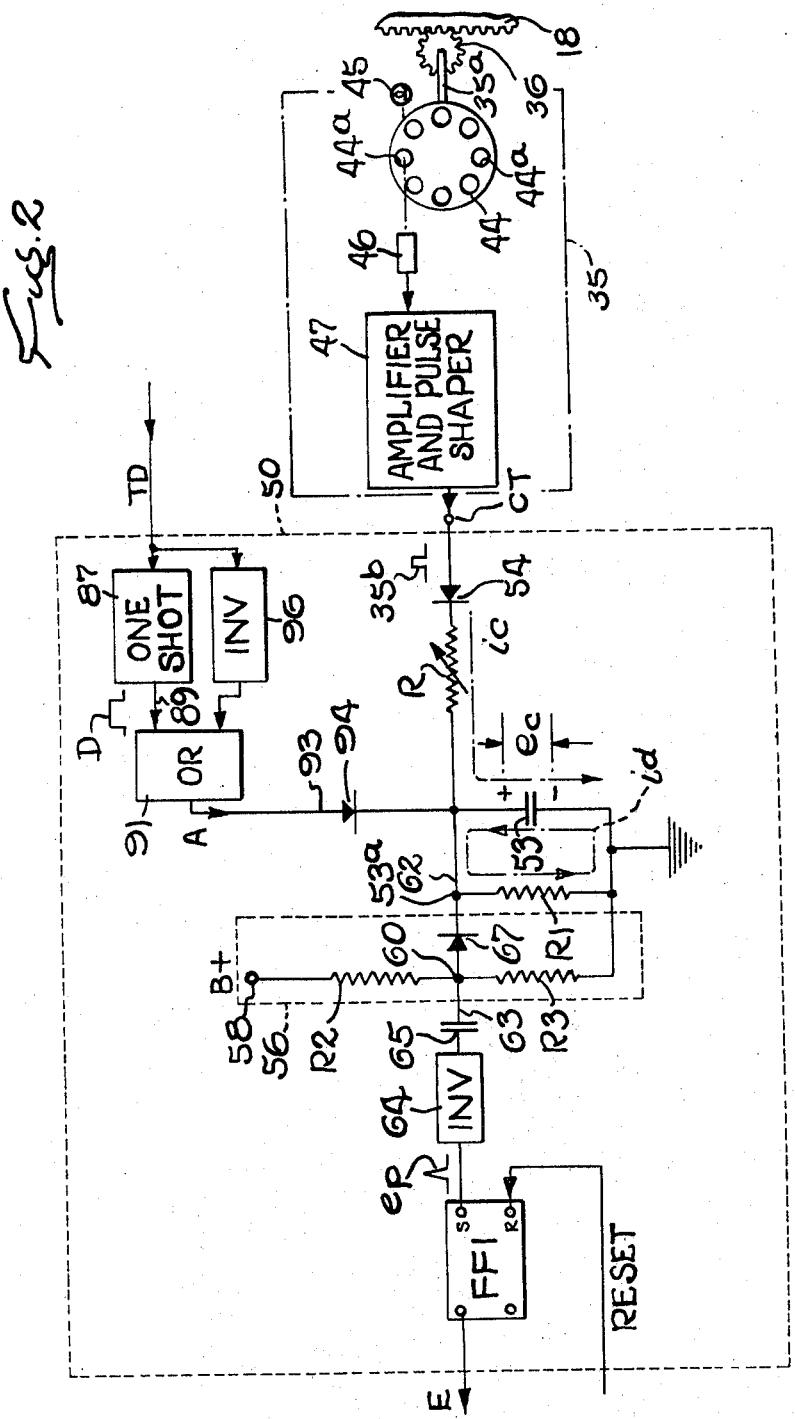

These and other objects and advantages of the invention will become apparent as the following description is considered in conjunction with the accompanying drawings, wherein:

FIGURE 1 is a diagrammatic illustration of an exemplary machine tool and control system which may be used in practicing the invention; and FIG. 2 is a detailed, diagrammatic, block-and-line illustration of certain components which are represented in FIG. 1 by more generalized blocks.

While the invention has been shown and will be described in some detail with reference to specific and exemplary procedures, and with reference to a particular embodiment of apparatus, there is no intention to limit the invention to such details. On the contrary, it is intended here to cover all alternatives, modifications and equivalents which fall within the spirit and scope of the invention as expressed in the appended claims.

TYPICAL ENVIRONMENT IN THE PRACTICE OF THE INVENTION

As a typical machine with which the invention may be used, FIG. 1 shows in diagrammatic form a vertical drilling machine having a spindle 10 mounting a chuck 11 at its lower end and carrying a tool element in the form of a cutter or drilling bit 12 which is adapted to penetrate and drill holes in a workpiece element 14. To move the bit 12 and the workpiece relatively toward and away from one another, the spindle 10 is journaled by suitable thrust bearings in a quill 15 mounted for up and down movement. The quill may be driven in either such direction by rotation of a pinion 16 engaged with the teeth of a rack 18 formed on or rigidly fixed to the quill body. As the quill, together with the spindle and cutter rotatably carried thereby, is moved vertically, the spindle and cutter are continuously rotated by a spindle speed drive 19 having its output shaft coupled via gears 20, 21 to a splined shaft 22. A gear 24 vertically slidable along the splined shaft is constantly meshed with a drive pinion 25 fast on the spindle, so that regardless of the vertical movement or position of the spindle, it is rotationally driven to rotate the bit 12.

The rotation direction and speed of the spindle 10 and the cutter 12 are controlled by the spindle speed drive 19, various forms of which are known to those skilled in the art and the details of which thus need not be here described. In the preferred arrangement, the spindle speed drive 19 responds to speed command signals SC to rotate the spindle and cutter at any desired speed and in the desired direction.

In a similar manner, the direction and rate of vertical movement of the quill 15 are controlled by a reversible traverse and feed servo drive 28 having its output shaft coupled to the pinion 16 and serving as a means to drive the cutter 12 and the spindle 10 either upwardly or downwardly. The servo drive here shown only in block representation may take any one of a variety of forms well known in the art, and its details are not critical to the practice of the present invention. For convenience of explanation, the servo drive 28 may be considered as responsive to three possible input signals TD, FD, and TU for respectively causing "traverse down," "feed down," or "traverse up" motion of the cutter. The term "traverse" is here used conventionally as denoting a rapid traverse or high velocity which normally lies within a predetermined narrow range of values reached after very rapid acceleration of the cutter from a dead stop. The term "feed" is here used in a conventional sense to designate a velocity somewhat less than the traverse velocity, and the specific value of which is determined by feed command signals FC supplied to and stored in the servo drive system 28. Thus, it may be understood without further elaboration that the servo drive 28 serves (a) as a means for moving the element or cutter 12 downwardly toward the workpiece 14 through the initial portion of a forward stroke at a high or traverse velocity in response to the input signal TD, (b) as a means for moving the cutter 12 downwardly toward or into the workpiece through the remainder of the forward stroke at a low or feed velocity in response to the signal FD, and (c) as a means for moving the cutter 12 upwardly out of and away from the workpiece 14 through a return stroke at a traverse velocity in response to the input signal TU.

In the present instance, and as will be confirmed hereinafter, the signals TD, FD and TU may be considered as binary signals, each of which may have either a "1" or "0" level, and only one of which is at an effective or "1" level at any given time so as to produce the corresponding direction and velocity of motion for the quill 15. If all of these control signals supplied to the servo drive 28 are at their binary "0" levels, then the quill will be held stationary.

Although not essential to the practice of the invention, the drilling machine here partially shown is preferably operated to drill a succession of holes at different locations in the workpiece under "numerical control" of information contained on a digital record such as a punched tape. Each "block" of information on the punched tape may designate the location of a hole to be drilled and the depth of that particular hole. Prior to each cycle of lowering and retracting the cutter 12, the workpiece 14 will be automatically moved horizontally, for example, along X and Y axes, beneath the rotating spindle by a numerical positioning servo system 29 which receives positioning command signals PC derived from reading one block of data from the punched tape. As shown in FIG. 1, the workpiece 14 is clamped or locked fast on a table 30 slidable along ways (not shown) in X and Y directions in response to rotation of X and Y lead screws 31 (only one being shown) which are rotationally driven by the servo system 29. When the servo system has brought the table and workpiece to a halt in the commanded position, so that lowering of the cutter 12 will result in drilling a hole in the desired location, the servo system produces an "in position" signal IP.

Int he operation of an automatic, numerically controlled drilling machine, it is desirable to make each drilling cycle as short as possible so that the machine will function efficiently in drilling a large number of successive holes in the shortest feasible time. If the cutter 12 is traversed downwardly only to some predetermined point well above the workpiece surface, and then fed slowly while "cutting air" before it engages the workpiece, the drilling cycle will be lengthened and the efficiency of the machine reduced. On the other hand, in most all drilling machine operations, the materials of the cutter and the workpiece simply will not withstand the heat and stresses which would result if an attempt were made to drill a hole while the cutter is being advanced at the traverse rate. Thus, when the actual drilling begins, the cutter is advanced at a slower feed rate which is selected with reference to the materials of the cutter and workpiece to avoid damage to either. For these reasons, it has been common practice to traverse the cutter toward the workpiece until the former strikes the latter, and then to convert the motion to a feed velocity while the hole is being drilled.

One prior arrangement for accomplishing this is disclosed in Wohlfeil United States application Ser. No. 622,325, filed Mar. 10, 1967, wherein "down" and "up" electrical signals are created when the cutter is moving downwardly and upwardly, respectively, and wherein the "up" signal momentarily appears and is detected when the cutter, traveling in the downward direction, strikes and rebounds slightly from the workpiece in the upward direction. In response to detection of the "up" signal, the movement of the cutter is converted from traverse to feed so that the cutter will thereafter penetrate the workpiece at a feed rate. This arrangement is not entirely satisfactory when the workpiece is made of soft metal, such as aluminum, or when other types of cutters, such as taps or broaches, are used for machining pre-drilled holes in the workpiece since there is often insufficient rebounding of the cutter in such instances to produce the "up" signal necessary for the conversion of the rate of movement of the cutter.

SIGNALING OF ENGAGEMENT

In accordance with the present invention, a different, more reliable and more widely adaptable method is employed to signal almost instantaneously when a movable element (such as the cutter 12) engages an obstacle (such as the workpiece 14) in its path even though the workpiece may be made of relatively soft material and even though there may be initially only a relatively small area of actual engagement between the cutter and the workpiece. Such method involves sensing the velocity of the cutter as the latter approaches the workpiece, creating a signal proportional of the approach velocity, and detecting a decrease in the signal occurring as a result of a sharp reduction in the velocity of the cutter upon contact with the workpiece. In response to such detection, the drive of the cutter is converted from traverse to feed, so that the cutter thereafter will penetrate the workpiece at a feed rate.

A. Sensing and signaling the velocity

As an exemplary way of sensing and signaling the velocity of the cutter 12, a pulse generator 35 (FIG. 1) is coupled to be driven in response to movement of the quill 15 and is adapted to produce an output signal having a frequency proportional to the velocity of the cutter during movement of the latter. As here shown, a precision pinion 36 meshed with the rack 18 drives the input shaft 35a of the pulse generator, and the latter produces an output signal 35b in the form of recurring pulses. The output signal appearing on terminal CT contains one pulse for each .001" increment of cutter motion. The frequency of the output signal, that is, the number of cycles or pulses occurring in a given unit of time, varies substantially in proportion to changes in the speed of the cutter and thus is indicative of the velocity of the cutter.

FIG. 2 illustrates in more detail the organization and operation of the pulse generator 35. While the generator may take any of a variety of suitable forms, that shown diagrammatically in FIG. 2 includes an input shaft 35a (driven by the pinion 36) and carrying a disk 44 having angularly spaced apertures or notches 44a in its periphery. Light from a lamp 45 disposed on one side of the disk is alternately transmitted to or blocked from a photocell 46 coupled through a combination amplifier and pulse shaper 47 to the count output terminal CT of the generator. Briefly stated, as the disk 44 rotates during vertical movement of the quill 15, the photocell 46 is illuminated each time the quill moves .001" and thus applies a current pulse to the amplifier-pulse shaper each time such illumination occurs. The number of pulses occurring in a given time interval is equal to the number of increments of movement of the quill during the same interval. For example, with the quill moving at a rate of 1.0" per second, a signal with a frequency of 1000 pulses per second is applied to the amplifier-pulse shaper. The latter converts the signals from the photocell into pulses 35b of uniform width and height which appear at the terminal CT of the generator. Accordingly, each output pulse 35b appearing at the terminal CT corresponds to .001" of vertical movement of the quill 15, and the frequency of the pulses proportionally increases and decreases as the quill moves faster and slower, respectively.

B. Detecting a decrease in the signal

So long as the cutter 12 is moving rapidly at a traverse rate, the frequency of the pulses 35b will lie within a given and substantially constant range of values. When, however, the cutter engages the workpiece 14, its velocity will fall abruptly. The frequency of the pulses will fall sharply and will instantaneously drop below a value less than that which exists when the cutter velocity is in the normal traverse range. To detect the drop in the frequency of the pulses and to produce a signal indicative of such drop, an engagement sensor 50 is connected to the terminal CT of the pulse generator 35 to receive the pulses 35b and to create an engagement signal E when and only when the frequency of the pulses fall below its normal range, thus indicating engagement of the cutter with the workpiece. The engagement signal E thereby produced is utilized to terminate the drive at traverse rate and to initiate further drive of the cutter into the workpiece a a slower feed rate.

More specifically, and in the preferred but exemplary embodiment, the engagement sensor 50 comprises an averaging circuit or filter which converts the pulses into a D.C. voltage substantially proportional to their time-averaged value. For this purpose, the terminal CT is connected through a diode 54 and a resistor R to a capacitor 53 so that each pulse 35b tends to charge the latter by current flow along the path $i_c$, thereby creating a capacitor voltage $e_c$ of the indicated polarity.

During those intervals, however, between the successive pulses 35b, the capacitor 53 discharges by current flow along the path $i_d$ through a resistor R1 connected in parallel, so that the voltage $e_c$ exponentially decays. The charging time constant established by the resistor R and the capacitor 53 is chosen (and may be adjusted by varying the value of the resistor R) such that it is very low in comparison to the discharging time constant established by the resistor R1 and the capacitor 53. That is, the resistance value of the resistor R is considerably less than that of the resistor R1. The diode 54 prevents discharge current from returning back through the amplifier and pulse shaper 47. Thus, under normal traverse conditions, each pulse 35b will restore the voltage $e_c$ substantially to the peak value of the pulses, and the voltage $e_c$ will decay only slightly before the next such pulse arrives.

The averaging circuit, or what is commonly called an R-C integrator, in this way serves to make the voltage $e_c$ substantially proportional to the frequency of the pulses 35b, and thus substantially proportional to the velocity of the quill 15 and cutter 12. So long as the latter are traveling at a velocity greater than a predetermined value which is the lower limit of the normal range of traverse rates, the speed-representing voltage $e_c$ will be greater than a corresponding predetermined magnitude.

To give a specific, but not limiting, example, it may be assumed that the pulses 35b are 12 volts in amplitude, and that their frequency is 1000 hertz when the cutter is traveling at 60 inches per minute, the latter representing the lowest value of a range of normal traverse rates. At such a pulse frequency, the capacitor voltage $e_c$ may rise and fall with a small "ripple" between 11 and 12 volts, and its average value will be about 11.5 volts. If, however, the velocity of the cutter shoull fall below 60 i.p.m., then the capacitor voltage $e_c$ will decay to some value less than 11.0 volts during the intervals between successive pulses which appear at a frequency of less than 1000 hertz.

The lowest value of the voltage $e_c$ reached between successive ones of the pulses 35b need not necessarily be directly proportional to the velocity of the cutter, but it will be a monotonic function of such velocity and the corresponding pulse frequency. As the quill and cutter are being traversed toward the workpiece so that the capacitor voltage $e_c$ is being maintained above 11.0 volts, then when the cutter engages the workpiece, its velocity will drop abruptly, and the voltage $e_c$ will fall below a predetermined value (e.g., fall below 10 volts) which is less than the range of values corresponding to the range of traverse rates.

In keeping with the invention, the falling of the velocity-representing signal $e_c$ below such a predetermined value is detected and converted into a second signal indicative of engagement of the cutter with the workpiece. The second signal is utilized to control the servo drive 28 such that traverse drive of the cutter is terminated and downward feed drive is initiated. For this purpose, a voltage level discriminator 56 is connected to receive the capacitor voltage $e_c$ and arranged to produce an output pulse whenever that voltage falls below a predetermined value. A Schmitt trigger circuit may be employed for this function, but as here shown the discriminator 56 is formed simply by two resistors R2, R3 connected between a source 58 of positive voltage and ground to create a voltage divider having a junction 60 which normally resides at the selected predetermined voltage level, e.g., +10 volts, which is less than the lowest value of the capacitor voltage $e_c$ so long as the cutter is moving at a velocity within the traverse range. A unidirectionally conductive diode 67 is connected via conductor 62 to the upper terminal 53a of the capacitor 53, and poled so that it will be nonconductive so long as the voltage $e_c$ is greater than the predetermined level, i.e., greater than 10 volts. In this way, the junction 60 is clamped to a potential of +10 volts or the potential of the terminal 53a, whichever is less, and the junction 60 will fall below 10 volts in potential only when the voltage $e_c$ falls below 10 volts. In the latter case, the diode 67 conducts to draw increased current through the resistor R2, thereby increasing the voltage drop across that resistor, and reducing the potential at junction 60 below its normal value of +10 volts.

This reduction in potential at the junction 60 may be called a primary engagement signal, since it will occur only when the speed-representing voltage falls below a predetermined value, and thus only when the cutter strikes the workpiece while traversing toward the latter. To assure a definite response to the primary engagement signal, it is passed via a conductor 63 through a differentiating capacitor 65 and an inverter 64 to produce a positive pulse $e_p$ which is applied to the "set" input terminal of a bistate device or flip-flop FF1. Assuming the flip-flop to be initially in its reset state, the reduction below 10 volts in potential at junction 60 and the resulting pulse $e_p$ causes the flip-flop FF1 to be set and its output signal E to switch from a "0" to a "1" level.

It will be seen, therefore, that a secondary and pronounced engagement signal E will appear (i.e., will switch from a "0" to a "1" level) substantially at the instant the cutter 12 strikes the workpiece 14 while traversing toward the latter, because such engagement reduces the velocity of the cutter, thereby causing the frequency of the pulses 35b to drop so that the first signal or voltage $e_c$ drops below 10 volts and the discriminator 56 supplies a second signal or "setting" pulse $e_p$ to the normally reset flip-flop FF1. Since the velocity of the cutter will always be reduced and since the value of the first signal $e_c$ thus will always fall when the cutter engages the workpiece, a perceptible second signal or input pulse to the flip-flop FF1 will always be produced upon such engagement even though the cutter immediately proceeds to penetrate into the workpiece.

THE METHOD OF PRODUCING NORMAL DRILLING CYCLES

Now that the method and exemplary apparatus for creating an engagement signal are understood, it will be appropriate to describe the procedural steps and the apparatus for controlling the machine tool to produce successive cycles for drilling holes of desired depths and at desired locations in a workpiece. It will be assumed merely for the sake of example and completeness that the machine tool is to operate automatically under numerical control according to information contained on a digital record. Command information for each hole to be drilled is contained within one "block" of a punched tape 70 which is threaded to pass from a supply reel 71 to a take-up reel 72 through a tape reader 74 (FIG. 1). When the tape reader is started in response to a momentary signal applied to its start terminal ST, it steps the tape to read successive holes therein and supplies successive corresponding output signals to a decoder-distributor 75. The X and Y axis position commands within a block of the tape appear as signals PC on an output line 75a of the decoder, and these are routed to the positioning servo system 29 so that the table 30 begins moving the workpiece 14 toward a desired, commanded position beneath the retracted cutter 12.

Another group of signals resulting from the reading of a block on the tape 70 appear on an output line 75b of the decoder, and these signals DC define the depth command, i.e., the depth of the hole which is to be drilled, measured from the surface of the work at the location of that particular hole. Because the workpiece may have surface portions at different elevations, and the drill bit 12 may have different lengths, it is not feasible or practical to designate the location of the bottom of each desired hole by an absolute vertical position of the spindle 10. The depth command signals DC which appear on the decoder output line 75b thus numerically represent, and preferably in binary coded decimal notation, the actual depth of the hole to be drilled, regardless of the elevation of the work surface at the desired hole location. These depth command signals are routed via the output line 75b to the several inputs of a storage register of a drilling depth controller 76 shown in block form in FIG. 1. This controller is similar to that disclosed in the above-identified Wohlfeil application to which reference may be had for a more specific description of the arrangement and operation of the controller. It will suffice here to say that the controller stores the depth command signals; receives and counts those pulses 35b produced at the count terminal CT of the pulse generator 35 after engagement of the cutter with the workpiece, thereby to numerically signal the actual penetration of the cutter into the workpiece; and terminates the downward feed of the cutter into the workpiece when the difference between the numerically commanded depth and the numerically signaled penetration is reduced to zero. Simply by way of example, it may be assumed that the desired hole depth is 2.563", and that this number is represented by the command signals DC routed to and stored in the controller over the line 75b.

As the tape reader 74 continues to read rows in a given block of the punched tape 70, speed command signals SC may appear on the decoder output line 75c, and these are routed for storage and processing in the spindle speed drive 19 in order to cause the spindle 10 to be driven at a particular desired rotational speed. Similarly, further rows in a given block on the punched tape may contain feed command information, and as this is read by the tape reader 74, feed command signals FC will appear on the decoder output line 75d. These latter signals are routed for storage and utilization in the traverse and feed servo drive 28, and they serve to make the value of the feed velocity (which results when the drive 28 is conditioned for feeding operation) have a desired, commanded value.

After the tape reader 74 has been started and has read one complete block of data, it will sense an "end of block" code on the punched tape and the decoder will produce a momentary signal EB on its output line 75e. This momentary signal EB is applied to a "hold" terminal H of the tape reader, and causes the latter to stop the advancement and reading of the punched tape 70. The tape reader will be restarted to read the next block when a momentary signal is next applied to its start terminal ST.

After a block of data has been read from the punched tape 70 and the position command signals PC have caused the positioning servo system 29 to begin moving the workpiece 14 to the newly commanded position, the system 29 will produce an "in position" signal IP when the table 30 and the workpiece 14 are brought to a halt in the desired location.

In the practice of the present method, the cutter 12 is first moved at a traverse rate from a retracted position downwardly toward the workpiece 14. In the present instance, this is accomplished in response to the signal IP which is routed to the "set" input terminal of a flip-flop FF2 and causes its output signal, which here is the TD control signal, to switch to a binary "1" level. The flip-flop FF2 responds or "sets" only in response to the transition of the signal IP from the "0" to the "1" level, and the continued existence of the signal IP at the "1" level does not affect the flip-flop. In consequence of the signal TD switching to "1," the servo drive 28 is conditioned to drive the quill 15, the spindle 10 and the cutter 12 downwardly at a traverse rate.

Next, the engagement of the cutter 12 with the workpiece 14 is instantaneously signaled in the manner described above. The pulse generator 35 is employed to produce pulses 35b having a frequency proportional to the velocity of the cutter. As the cutter traverses downwardly, the frequency of the pulses will lie within a comparatively high range, thereby causing the voltage $e_c$ across the capacitor 53 to fluctuate within a relatively narrow range, say, between 11 and 12 volts. But when the cutter strikes the workpiece and undergoes reduction in velocity, the frequency of the pulses will drop, the voltage $e_c$ across the capacitor will fall below 10 volts, and a momentary pulse will be applied through the capacitor 65 and the inverter 64 (FIG. 2) to set the flip-flop FF1 and switch its output signal E to a binary "1" level. The engagement signal E from the flip-flop FF1 thus results when the voltage $e_c$ across the capacitor 53 drops below a predetermined value.

In response to the engagement signal E, the downward movement of the cutter 12 is continued, but such drive is converted from traverse to feed. For this purpose, the signal E is supplied to the reset terminal of the flip-flop FF2 which resets to the "0" state in response to the transition of the signal E from a "0" to a "1" level, so that the signal TD is restored to a binary "0" level; and the engagement signal E (which appears just before the flip-flop FF2 resets) is routed to the set input of a flip-flop FF3 whose output signal FD is thus switched to a binary "1" level. As a result, the servo drive 28 now drives the cutter 12 downwardly at the slower, commanded feed rate. The actual penetration of the cutter into the workpiece, and the drilling of the desired hole is thus commenced at a desired feed rate.

In the present instance, measurement of the penetration of the cutter 12 into the workpiece also is initiated in response to the engagement signal E which is produced the instant the cutter engages the workpiece 14. This is achieved by supplying to the count input terminal CI of the depth controller 76 those pulses 35b which appear after engagement, so that the controller can count the pulses and numerically signal the displacement of the cutter after the latter has initially engaged the work surface.

To make the controlled 76 initiate measurement of the cutter 12 only after the workpiece 14 has been contacted, the pulses 35b which appear at the terminal CT of the pulse generator 35 are coupled through a gate 80 to the input terminal CI of the controller. The gate 80 is normally held closed by the FD signal produced by the flip-flop FF3, this signal normally residing at a binary "0" level. When the cutter engages the workpiece, however, the engagement signal E sets the flip-flop FF3, thereby making the signal FD a binary "1" and conditioning the servo drive 28 so that it continues the downward drive of the cutter, but at a feed velocity. At the same time, the FD signal, now residing at a binary "1" level, causes the opening of the gate 80. As the cutter is fed into the workpiece, therefore, each pulse 35b produced on the terminal CT of the pulse generator 35 passes through the gate 80 to the count input terminal CI of the controller 76 and is counted by the latter. Thus, as the depth of the cutter tip progressively increases, the number of pulses stored in the controller increases and dynamically represents the instantaneous depth. For example, if the cutter has penetrated to a depth of 1.345" below the work surface, the number of pulses stored by the controller will be 1.345 assuming that one pulse is produced for each .001" of movement of the cutter.

When the controller 76 detects that the difference between the numerically signaled actual penetration and the numerically signaled commanded depth has been reduced to zero, thus indicating that the desired penetration has been reached, it produces a "hole complete" signal HC at a binary "1" level on its output line 81. If the commanded hole depth is, for example, 2.563" this will occur when 2.563 pulses have been received through the gate 80 subsequent to the appearance of the engagement signal E.

Returning now to the sequence of operational steps, the cutter 12 will continue feeding downwardly until the workpiece 14 is penetrated to the desired depth and the hole complete signal HC is produced on the output line 81 of the controller 76. This signal is routed to the reset terminal of the flip-flop FF3, and resets the latter. As a result, the signal FD reverts to a binary "0" level, the downward feeding of the cutter is terminated, and the gate 80 is restored to its normally closed condition. Concurrently, the output signal HC from the controller is applied to the set terminal of a flip-flop FF4, causing the output signal TU thereof to switch to a binary "1" level. Thus, the servo drive 28 is conditioned to retract the cutter, the spindle 10 and the quill 15 upwardly at a traverse rate.

This upward traverse will continue until the quill is moved to a fully retracted position at which it engages and actuates a limit switch LS, causing the latter to produce an upper limit signal UL. The latter signal is routed via a line 83 to reset the flip-flop FF4, thereby restoring the signal TU to a binary "0" level and terminating the upward movement of the quill to complete one drilling cycle. The signal UL additionally is applied to the controller 76 to restore the signal HC to a binary "0" level, and also is applied to the start terminal ST of the tape reader 74 so that the latter begins to read the next block of command data from the punched tape 70.

The sequence of steps described above will now be repeated. The tape reader 74 will read the next block of command information and stop. The positioning servo system 29 will respond to the new position command signals PC and move the workpiece 14 to the newly commanded position beneath the retracted cutter 12. When this positioning is completed, the in position signal IP will set the flip-flop FF2 to switch the signal TD to a binary "1" level and start the cutter traversing downwardly. As shown in FIG. 1, the signal TD is coupled through a differentiator 84 to the reset terminal R of the controller 76 and also to the reset terminal of the flip-flop FF1. Thus, when the signal TD first switches to a binary "1" level, the counter of the controller 76 is cleared of the previously received pulses 35b and is reset to zero, so that it may begin to count those pulses received after engagement of the cutter with the workpiece during the new cycle. In addition, the flip-flop FF1 (FIG. 2) is reset so as to be in condition to respond to the momentary pulse which will be transferred through the capacitor 65 from the discriminator 56 upon such engagement.

In accordance with another aspect of the invention, an artificial high velocity signal A (FIG. 2) is impressed upon the capacitor 53 while the cutter 12 is accelerating from a dead stop to a full traverse velocity in order to prevent the capacitor from discharging and causing generation of a false engagement signal E as a result of low frequency pulses 35b existing during such acceleration. Although the signal A may be created in different ways, it herein is produced with a monostable or "one-shot" multivibrator 87 included in the engagement sensor 50. The one-shot device receives the signal TD and triggers to produce output pulse D which resides at a "1" level for a predetermined time interval when and only when the signal TD switches to a binary "1" level. The output pulse D is supplied via a line 89 to one input of an OR circuit 91 whose output is connected to the capacitor terminal 53a via a line 93 and a unidirectionally conductive diode 94. Accordingly, when the flip-flop FF2 is first set to switch the signal TD to a binary "1" level and initiate downward traverse of the cutter 12, the signal TD triggers the one-shot device 87 which produces a pulse D which may be, for example, 12 volts in amplitude and 125 milliseconds in duration. In response to the pulse D, the output signal A of the OR circuit 91 switches to a +12 volt level and quickly charges the capacitor 53 to its peak voltage of 12 volts. Thus, during the short interval after the TD signal appears and while the cutter is accelerating from a dead stop so that the pulses 35b have a low but increasing frequency, the signal A maintains a full 12 volt charge on the capacitor independently of the pulses 35b and the velocity of the cutter. This eliminates the possibility of the capacitor discharging prematurely and causing the generation of a false engagement signal.

As soon as the pulse D disappears upon completion of the 125 millisecond delay, the output signal A of the OR circuit 91 reverts to a binary "0" level to discontinue the impression of a high, velocity-independent voltage on the capacitor 53 during the remainder of the forward stroke of the cutter 12 at traverse velocity. The capacitor then is charged only by the pulse generator 35 and is free to discharge, as explained above, upon engagement of the cutter with the workpiece 14. In this particular instance, the 125 millisecond interval, during which the one-shot device 87 creates the pulse D, is amply sufficient to keep the capacitor 53 charged until the cutter attains full traverse velocity, but it should be understood that the specific time interval required may vary considerably in various different machines.

Advantageously, the capacitor 53 is again charged artificially by the signal A and independently of the velocity-responsive pulses 35b from the instant the cutter 12 engages the workpiece until the instant the cutter starts through another downstroke. This precludes the possibility of the appearance of the engagement signal E except at the instant at which the cutter engages the workpiece while traversing toward the latter. For this purpose, the signal TD is routed to the other input of the OR circuit 91 through an inverter 96 which conventionally converts binary "1" level signals into binary "0" level signals and vice versa. In consequence, when the cutter engages the workpiece and the engagement signal E resets the flip-flop FF2 to switch the signal TD to a binary "0," the inverter 96 applies a binary "1" signal to the OR circuit 91. The output signal A of the latter thus switches to a "1" level and impresses a full charge of 12 volts on the capacitor 53 during the time the cutter is feeding downwardly into the workpiece. Since the signal TD remains at a "0" level while the cutter is being retracted in response to the signal TU, the capacitor also is held in a charged state by the signal A during such retraction. Thus, the capacitor will not respond to decreases in the frequency of the pulses 35b occurring during either feeding or retraction of the cutter and will not initiate an inappropriate engagement signal. Of course, when the signal TD goes to and remains at a binary "1" level at the beginning of and during the next downward traverse of the cutter, the signal supplied to the OR circuit 91 through the inverter 96 will be at a binary "0" level and will be ineffective to produce the artificial signal A. Accordingly, as soon as the cutter accelerates downwardly from a dead stop and attains full traverse velocity, both inputs to the OR circuit 91 will be at a binary "0" level since the pulse D then will have disappeared. The only charge impressed on the capacitor thus will be that created by the pulses 35b, and the capacitor then will be fully capable of responding to a drop in the frequency of the pulses upon engagement of the cutter with the workpiece.

It will now be understood that the invention here described brings to the art a very reliable method for controlling the motion of a movable element such as a tool element, and wherein the engagement of the movable element with a second element such as a workpiece is signaled almost instantaneously by detecting a reduction in velocity of the movable element. Since a reduction in velocity always occurs upon such engagement, the present method is especially well suited for use with workpieces made of comparatively soft material and/or with tool elements which machine previously formed holes in the workpiece, i.e., in circumstances where the tool does not rebound perceptibly from the workpiece when engagement occurs.

We claim as our invention:

1. The method of converting the motion of a first element from a traverse rate to a slower feed rate upon engagement with a second element, comprising advancing the first element at a traverse rate, generating an electrical signal substantially proportional to the velocity of the first element during such advance, detecting a change in said signal resulting from a reduction of said velocity upon engagement of the first element with the second element, and in response to such detection thereafter advancing the first element toward the second element at a feed rate.

2. The method of converting the motion of a movable tool element from a traverse rate to a slower feed rate for efficient machining of a workpiece, comprising driving the tool element toward the workpiece at a traverse rate, generating a first signal substantially proportional to the velocity of said tool element while so driving the latter, creating a second signal in response to said first signal falling below a predetermined value which is less than the value of the first signal when the tool element is moving at said traverse rate, and in response to such second signal terminating the driving of the tool element at said traverse rate and initiating the drive thereof in the same direction but at a slower feed rate.

3. In a system having a first element relatively movable toward a second element, the combination comprising means for initiating and continuing movement of said first element toward said second element at a traverse rate, means for sensing the velocity of said first element during such movement and for producing an electrical signal substantially proportional to such velocity, means for detecting a change in said signal occurring as a result of a reduction in the velocity of said first element as the latter engages said second element, and means responsive to such detection for (a) disabling said first means and (b) enabling means for continuing movement of said first element in the same direction but at a slower feed rate.

4. A system as defined in claim 3 further including means for disabling said detecting means during the time said first element is accelerating toward said second element from a dead stop to said traverse rate.

5. In apparatus for signaling the engagement with a second element by a first element as the latter is being driven toward the former, the combination comprising means for moving said first element toward said second element at a normal velocity which lies within a predetermined range of values, means for generating a first signal substantially proportional to the velocity at which said first element is moving, and means for producing a second signal in response to said first signal falling below a predetermined value which is less than the value of said first signal when said first element is moving at a velocity within said range.

6. Apparatus as defined in claim 5 in which said means for generating said first signal includes means for producing a series of voltage pulses having a frequency substantially proportional to the velocity of said first element and an averaging circuit for producing a D.C. voltage proportional to the time-averaged value of said pulses, and in which said means for producing said second signal comprises a voltage level discriminator connected to receive said D.C. voltage and operable to create said second signal when the frequency of said pulses falls below a predetermined value which is less than the frequency of the pulses when said first element is moving at a velocity within said range.

7. In apparatus for signaling the engagement with a second element by a first element as the latter is being driven toward the former, the combination comprising means for driving said first element toward said second element at a normal velocity which lies within a predetermined range of traverse values, means responsive to motion of said first element for generating a series of pulses having a frequency substantially proportional to the velocity of such element, a capacitor, first circuit means having a first time constant for applying said pulses to charge said capacitor, second circuit means having a second time constant higher than the first for discharging said capacitor, and means for producing an engagement signal in response to the voltage across said capacitor falling below a predetermined value which is less than the lowest voltage produced across said capacitor when said first element is moving at a velocity within said range.

8. Apparatus as defined in claim 7 further including third circuit means for charging said capacitor independently of said pulses and maintaining the voltage across said capacitor above said predetermined value from the time said first element accelerates toward said second element from a dead stop until the time said second element reaches a velocity which lies within said predetermined range.

9. Apparatus as defined in claim 7 in which said first and second circuit means each include a resistor connected to said capacitor, the resistor of said first circuit means having a lower value of resistance than the resistor of said second circuit means.

10. Apparatus as defined in claim 9 in which the resistor of said first circuit means is connected in series with said capacitor and with said means for generating said pulses, and in which the resistor of said second circuit means is connected in parallel with said capacitor.

11. Apparatus as defined in claim 10 in which said means for producing said engagement signal comprise a voltage level discriminator connected to said second circuit means and operable to detect when the voltage across said capacitor falls below said predetermined value.

12. In apparatus having a cutter element movable toward and into a workpiece through a forward stroke of preselected length and movable away from the workpiece through a return stroke, the combination comprising first means for (a) driving said element through the initial portion of said forward stroke at a normal traverse velocity which lies within a predetermined range of values, (b) thereafter driving said element through the remainder of said forward stroke at a feed velocity below said range, and (c) then driving said element reversely through said return stroke after completion of said forward stroke, means responsive to the motion of said element during said forward stroke for generating a series of pulses having a frequency substantially proportional to the velocity of said element, a capacitor, first circuit means having a first time constant for causing said pulses to charge said capacitor, second circuit means having a second time constant higher than the first for discharging said capacitor, means for producing an engagement signal (a) as an incident to said velocity falling below the lower limit of said range upon engagement of said tool element with said workpiece during said forward stroke and (b) in response to the voltage across said capacitor falling below a predetermined value which is less than the lowest voltage produced across said capacitor when said element is moving at a velocity within said range, means for detecting said signal and operable to cause said first means to discontinue driving of said element at said traverse velocity and to initiate driving of said element at said feed velocity, and third circuit means for charging said capacitor independently of said pulses and to a voltage higher than said predetermined value starting from the time the element begins moving at said feed velocity and continuing during the entire return stroke of said element.

13. Apparatus as defined in claim 12 in which said third circut means begins charging said capacitor in response to said engagement signal.

14. Apparatus as defined in claim 12 in which said third circuit means further includes means for charging said capacitor to a voltage higher than said predetermined value during the time said element is accelerating at the beginning of said forward stroke from a dead stop to a velocity within said range.

References Cited
UNITED STATES PATENTS

| | | | |
|---|---|---|---|
| 3,021,464 | 2/1962 | Philip | 318—162 |
| 3,302,492 | 2/1967 | Weidig | 77—32.7 XR |

FRANCIS S. HUSAR, Primary Examiner

U.S. Cl. X.R.

318—162